(12) United States Patent
Harder et al.

(10) Patent No.: US 8,211,962 B2
(45) Date of Patent: *Jul. 3, 2012

(54) FILLED POLYAMIDE MOLDING MATERIALS

(75) Inventors: Philipp Harder, Chur (CH); Nikolai Lamberts, Bonaduz (CH)

(73) Assignee: EMS-Patent AG, Domat/Ems (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/742,881

(22) PCT Filed: Nov. 12, 2008

(86) PCT No.: PCT/EP2008/009550
§ 371 (c)(1),
(2), (4) Date: Aug. 20, 2010

(87) PCT Pub. No.: WO2009/062691
PCT Pub. Date: May 22, 2009

(65) Prior Publication Data
US 2011/0105655 A1    May 5, 2011

(30) Foreign Application Priority Data

Nov. 16, 2007 (EP) .................................. 07022307

(51) Int. Cl.
*C08G 18/77* (2006.01)
(52) U.S. Cl. ........... 524/115; 524/101; 524/29; 524/139
(58) Field of Classification Search ............... 524/115
See application file for complete search history.

(56) References Cited

U.S. PATENT DOCUMENTS

| 2003/0162001 A1* | 8/2003 | Rosch et al. ............... 428/192 |
| 2005/0234180 A1* | 10/2005 | Ono et al. ................. 524/451 |
| 2005/0250885 A1 | 11/2005 | Mercx et al. |
| 2006/0058431 A1 | 3/2006 | Cartier et al. |
| 2007/0072970 A1 | 3/2007 | Schneider |
| 2008/0167415 A1* | 7/2008 | Stoeppelmann et al. ..... 524/494 |

FOREIGN PATENT DOCUMENTS

| DE | 10346326 A1 | 5/2005 |
| EP | 0246620 | 11/1987 |
| EP | 0376 616 | * 7/1990 |
| EP | 0376616 | 7/1990 |
| EP | 1010726 | 6/2000 |
| EP | 1972659 | 9/2008 |
| JP | 10219026 | 8/1998 |
| WO | 2007080754 | 7/2007 |
| WO | 2007106074 | 9/2007 |

OTHER PUBLICATIONS

International Search Report and Written Opinion for PCT/EP2008/009550 completed Apr. 17, 2009.
English translation of the International Preliminary Report on Patentability for PCT/EP2008/009550, issued Jun. 1, 2010.

* cited by examiner

*Primary Examiner* — Doris Lee
(74) *Attorney, Agent, or Firm* — Barnes & Thornburg LLP

(57) ABSTRACT

Filled polyamide molding compounds which, in addition to a selected polymer mixture comprising polyamides and a flameproofing agent, contain glass fibers with non-circular cross-sections, the use of such molding compounds for the production of molded articles, and the molded articles themselves.

18 Claims, No Drawings

FILLED POLYAMIDE MOLDING MATERIALS

CROSS REFERENCE TO RELATED APPLICATIONS

This application is the U.S. national phase of PCT/EP2008/009550 filed Nov. 12, 2008. PCT/EP2008/009550 itself claims the benefit of the Nov. 16, 2007 filing date of European patent application 07 02 23 07.8. The disclosures of both of EP 07 02 23 07.8 and PCT/EP2008/009550 are hereby incorporated by reference herein in their entireties.

The invention relates to filled polyamide moulding compounds which, in addition to a selected polymer mixture comprising polyamides and a flameproofing agent, contain long glass fibres with a non-circular cross-sectional area, Furthermore, the present invention relates to the use of such moulding compounds for the production of moulded articles and the moulded articles themselves, Polyamides are widely used nowadays as structural elements for indoors and outdoors, which can be attributed essentially to the excellent mechanical properties.

An improvement in the mechanical properties, such as strength and rigidity, can be achieved in particular by the addition of fibrous reinforcing materials, e.g. glass fibres, Thus EP 0 246 620 B1 describes a glass fibre-reinforced thermoplastic plastic material, glass fibres with a rectangular, elliptical or envelope-shaped cross-section in cut form being used here.

In EP 0 376 616 B1, a thermoplastic polymer composition in which a fibre-like reinforcement is contained is disclosed, the latter having a non-circular cross-section and having a curved or semi-circular contour.

Finally DE 103 46 326 A1 discloses flameproof polyamide moulding compounds and the use thereof, glass fibres with a round cross-section in the form of endless strands (rovings) or in cut form (glass fibres) being incorporated here as reinforcing materials, However it has been shown that the glass fibre-reinforced plastic materials, known to date in the state of the art, even polyamide moulding compounds which contain glass fibres, still do not deliver satisfactory results in all respects. It is therefore desirable to make available polyamide moulding compounds reinforced with glass fibres and moulded parts which can be produced herefrom, which achieve low distortion, high transverse rigidity and strength and also excellent surface quality with at the same time a high filling degree with the reinforcing fibres. The PA moulding compound must at the same time also be readily processible, i.e. it should have good flowability and also good flameproofing properties. In particular, there is a great need to have moulded articles made of polyamide moulding compounds with glass fibres which, with respect to thermostability, have superior properties relative to the state of the art.

It is therefore the object of the present invention to indicate polyamide moulding compounds which can be processed to form moulded articles, the moulded articles being intended to have excellent properties as far as possible at the same time with respect to distortion, notch impact strength, transverse rigidity and strength and also surface quality and thermostability (HDT C). The moulded articles should furthermore have good fire protection.

This object is achieved with respect to the moulding compound by the features of patent claim 1, with respect to the moulded article by the features of patent claim 17. The subclaims reveal advantageous developments, The proposed filled polyamide moulding compound according to the invention is distinguished, according to the independent patent claim 1, in that it has a polymer mixture which forms a polyamide matrix and has been formed from specific educts.

The polymer mixture (A) comprises accordingly 55 to 90% by weight, in particular 60 to 85% by weight, of at least one aliphatic polyamide (A1) which is selected from the group PA6, PA46, PA66, PA610, PA612, PA6/12, PA1010, PA11, PA12, PA1012, PA1212 and/or mixtures and/or copolyamides hereof. PA6 and PA66 are thereby preferred.

Furthermore, the polymer mixture can contain as second component 10 to 45% by weight of at least one polyamide (A2) which is selected from MACM10-18, MACMI, MACMT, MXDI, MXD6, MXD6/ MXDI, PACM10-18, 6I, 6T, 6T/66, 6I/6T and also mixtures and/or copolyamides hereof. Preferably, the polyamide (A2) is contained in the polymer mixture with 10 - 45% by weight, particularly preferably with 15 - 40% by weight.

It is now essential in the proposed filled polyamide moulding compound that, in the polyamide matrix which comprises 25 to 72% by weight of the above-described polymer mixture, 20 to 65% by weight of a glass fibre with a non-circular cross-sectional area and a dimensional ratio of the main cross-sectional axis to the subsidiary cross-sectional axis of 2 to 8 is contained, There are understood by the glass fibres (8) used according to the invention, glass fibres with a flat shape and a non-circular cross-sectional area, these being used preferably in the form of endless strands (rovings). The dimensional ratio of the main cross-sectional axis to the subsidiary cross-sectional axis is thereby preferably between 3.5 and 6.0, particularly preferred between 3.5 and 5.0. The cross-sectional area is thereby preferably longitudinally oval, elliptical or almost rectangular. The glass fibre itself can thereby be selected from the group comprising E-glass fibres, A-glass fibres, C-glass fibres, D-glass fibres, M-glass fibres, S-glass fibres and/or R-glass fibres, E-glass fibres being preferred. The glass fibres per se can also be provided with an amino- or epoxysilane coating.

The glass fibres (B) according to the invention with a non-circular cross-section are used either as short glass fibre (cut glass with a length of 0.2 to 20 mm, preferably 2-12 mm) or as long glass fibres (endless fibres or rovings).

A further characterising feature of the glass fibres used resides in the fact that the length of the main cross-sectional axis is preferably in the range of 6 to 40 μn, in particular in the range of 17 to 30 μm and the length of the subsidiary cross-sectional axis is in the range of 3 to 20 μm, in particular in the range of 4 to 10 μm.

From a material point of view with respect to the composition of the polymer mixture forming the polyamide matrix, the invention basically includes all combinations of the aliphatic polyamides mentioned under the features (A1), possibly also in combination with the polyamides mentioned under (A2). The aliphatic polyamides (A1) thereby preferably have a solution viscosity $n_{rel}$, measured in m-cresol (0.5% by weight, 20° C.) in the range of 1.3 to 2.3, preferably in the range of 1.35 to 2.0, in particular in the range of 1.40 to 1.90. The production of these aliphatic polyamides is effected, as known from the state of the art, by polycondensation or polymerisation of the corresponding lactams and/or aminocarboxylic acids and/or diamines and diacids.

In the case of the polyamides A2, the copolyamides 6I/6T and also MACM12 and MXD6/MXDI are preferred. With respect to the copolyamides 6I/6T, two different composition ranges are particularly preferred. On the one hand, these are the amorphous copolyamides with a proportion of less than 50% by mol 6T units, a composition range 6T:6I of 20:80 to 45:55 being preferred and, on the other hand, these are the high-melting copolyamides with a 6T proportion of greater than 50% by mol, a composition range 6T:6I of 55:45 to 80:20, in particular of 70:30, being preferred. With respect to the copolyamides MXD6/MXDI, MXD6-rich compositions are preferred, in particular with an MXD6 content of greater than 80% by mol.

With respect to the polymer mixture (A) the following compositions are preferred:
(A1): PA 66
(A2): PA 6I/6T, the molar ratio being in the range of 65:35 to 75:25 or in particular being 67:33.
(A1): PA 610 and/or PA 1010, the components in the case of a mixture being used in the ratio of 1:1 to 4:1.
(A2): PA 6I/6T, the molar ratio being in the range of 65:35 to 75:25 or in particular being 67:33.
(A1): Mixture of PA 6 and PA66, in the ratio of 1:2 to 1:4, in particular of 1:4
(A2): PA 6I/6T, the molar ratio being in the range of 65:35 to 75:25 or being in particular 67:33,
(A1): PA 66
(A2): PA 6I/6T, the molar ratio being in the range of 40:60 to 25:75 or in particular being 30:70.
(A1): PA 66
(A2): PA 6T/66, the molar ratio being in the range of 50:50 to 70:30 or in particular being 55:45.
(A1): PA 66
(A2); PA MXD6/MXDI, the molar ratio being in the range of 70:30 to 90:10 or in particular being 88:12,
(A1): PA12
(A2): PA MACM12,
(A1): PA12
(A2): PA MACM/12, the content of laurinlactam being in the range of 15 to 45% by mol, preferably less than 40% by mol, in particular less than 35% by mol.

The component (A1) respectively being used preferably in the range of 60 to 80% by weight, in particular of 65 to 75% by weight and component (A2) preferably in the range of 20 to 40% by weight, in particular in the range of 25 to 35% by weight, In a particular embodiment, the following compositions are preferred for the polymer mixture (polyamide matrix):
(A1): 70 - 100% by weight of PA 1010 or PA 1012 or PA 11 or PA 12
(A2): 0 - 30% by weight of PA MACM12 or PA MACMI/ 12 or PA PACM12/MACM12,
(A1): 70 - 100% by weight of a mixture of PA6 and PA66, in the ratio of 1 : 2 to 1 : 4, in particular of 1 : 4,
(A2); 0 - 30% by weight of a PA 6I/6T, the molar ratio being in the range of 65:35 to 75:25 or in particular being 67:33, it being preferred in particular if the polymer matrix is formed exclusively by component (A1).

In a further preferred embodiment, the component (A2) has a higher melting point than (A1), the melting point of (A2) being greater than 270° C., in particular greater than 290° C.

In a further embodiment, the component is amorphous and has a glass transition temperature of greater than 90° C., preferably greater than 110° and particularly preferred greater than 140° C., The polyamides (A2) thereby preferably have a. solution viscosity $\eta_{rel}$, measured in m-cresol (0.5% by weight, 20° C.) in the range of 1.3 to 2.0, preferably in the range of 1.35 to 1.9, in particular in the range of 1.40 to 1.85, The production of the polyamides (A2) is effected, as likewise known from the state of the art, by conversion of essentially molar quantities of the corresponding diamines and dicarboxylic acids and possibly the addition of lactams and/or aminocarboxylic acids.

The moulding compound according to the invention contains furthermore also 8 - 25% by weight, preferably 10 - 22% by weight and in particular 12 - 20% by weight of a flameproofing agent (C), The flameproofing agent (component (C)) thereby comprises 60 - 100% by weight, preferably 70 - 98% by weight, in particular 80 - 96% by weight of a phosphinic acid salt and/or of a diphosphinic acid salt (component (C1) and also 0 - 40% by weight, pereferably 2 - 30% by weight, in particular 4 - 20% by weight of a melamine polyphosphate (component (C2)), Flameproofing agents of this type are known from the state of the art. In this respect reference is made to DE 103 46 3261.

There is preferred as component (C1) a phosphinic acid salt of the general formula I and/or formula (II) and or polymers thereof

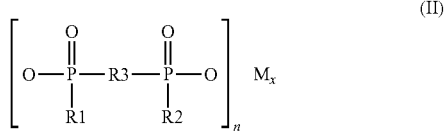

in which
$R^1$, $R^2$ are the same of different and mean $C_1$-$C_8$ alkyl, linear or branched and/or aryl,
$R_3$ means $C_1$-$C_{10}$ alkylene, linear or branched, $C_6$-$C_{10}$ arylene, -alkylarylene or arylalkylene;
M means metal ion from the $2^{nd}$ or $3^{rd}$ main or subsidiary group of the periodic table,
m 2 or 3,
n 1 or 3,
x 1 or 2.

Al, Ca and Zn are used preferably as metal ion.

The polymer mixture forming the polyamide matrix can furthermore, as already known from the state of the art, also contain particle-and/or layer-shaped fillers. These particle-and/or layer-shaped fillers (D) can be present in the polymer mixture in a proportion up to 20 per cent by weight. A preferred quantity of fillers is 0.1 to 15% by weight, There may be mentioned as examples of fillers of this type which can be present in particle-and/or layer-shape, whiskers, talcum, mica, silicates, quartz, titanium dioxide, wollastonite, kaolin, silicic acids, magnesium carbonate, magnesium hydroxide, chalk, ground or precipitated calcium carbonate, lime, feldspar, barium sulphate, permanent-magnetic or magnetisable metals or alloys, glass balls, hollow glass balls, hollow-ball silicate fillers, natural layer silicates, synthetic layer silicates and a mixture hereof.

There may be mentioned as preferred further reinforcing materials, for example carbon fibres (carbon fibres, graphite fibres), boron fibres, aramide- (p-or m-ararnide fibres (e.g. Kevlar® or Nomex®, DuPont) or mixtures thereof) and basalt fibres, the mentioned reinforcing fibres being able to be used as short or long fibres, also in the form of a mixture of different fibres, In a further alternative embodiment according to the invention, the glass fibres used according to the invention can be present in a mixture with carbon fibres (carbon fibres, graphite fibres). By exchanging a part of the glass fibres for carbon fibres, a hybrid fibre-reinforced compound is hence produced, the rigidity of which is increased in comparison with purely glass fibres. The mixture of glass- and carbon fibres can have a weight ratio of glass fibre/carbon fibres of 70/30 to 97/3, in particular of 80/20 to 95/5, Preferably, the moulding compounds according to the invention essentially contain only the component (B) as reinforcing fibre, in particular exclusively the component (B) as reinforcing fibre. The component (B), according to a further preferred embodiment, is present in the range of 30-60 per cent by weight, in particular 35-55 per cent by weight, preferably of at least 40 per cent by weight of the polyamide moulding compound, this proportion being formed preferably for the most part or even exclusively by glass fibres with a non-circular cross-section.

In the polymer mixture which forms the polyamide matrix, also additives D can furthermore be contained in a quantity up to 5% by weight, preferably in a quantity of 0.1 to 5% by weight. Normal additives are for example heat protection agents, antioxidants, light protection agents, lubricants, mould-release agents, nucleation agents, pigments, colourants and anti-drip agents and also mixtures hereof.

It has been shown in tests that in particular a polyamide moulding compound which contains the following components has superior properties:
A; 25 - 72% by weight of the polyamide matrix,
B; 20 - 65% by weight of glass fibres,
C: 8 - 20% by weight of the flameproofing agent,
D: 0.1% - 15% by weight of filler, and
E: 0.1% - 5% by weight of additives, the sum of these components being 100% by weight.

It was found surprisingly that, if the filled polyamide moulding compounds according to the invention are processed to form moulded articles, moulded articles are obtained which have above-average properties, in particular with respect to notch impact strength, strength and rigidity, in particular transversely relative to the main fibre direction, and also thermostability (HDT C).

Furthermore, it should be particularly stressed in the case of the moulding compound according to the invention and the moulded articles produced therefrom that the thermostability temperature under load according to ASTM D 648 (HDT-C) is greater by at least 10° C. than that of the comparable polyamide moulding compounds with glass fibre with a round cross-section as filling. It has even been shown that the thermostability temperature with the comparable polyamide moulding compounds is greater by up to 20° C.

It should be stressed furthermore in the case of the PA moulding compounds or in the case of the moulded articles produced therefrom that in combination with the previously described outstanding properties also outstanding flameproofing is achieved. The moulding compound is according to UL classification V0 in 0.8 mm thick test bodies.

It should be stressed in particular in the case of the moulding compound according to the invention and the moulded articles produced therefrom that the notch impact strength at 23° C. is higher on average by 80 to 100% than that of the comparable polyimide moulding compound with round glass fibres (i.e. glass fibres with a circular cross-sectional area) as reinforcement.

Surprisingly, in the case of the moulding compounds according to the invention and the moulded articles produced therefrom, it could be established that the transverse rigidity and transverse strength, relative to comparable polyamide moulding compounds with round glass fibres, could be significantly improved. In the case of the moulding compounds according to the invention and the moulded articles produced therefrom, the transverse rigidity (measured transversely relative to the spraying direction) is at least 55%, preferably at least 58% of the measured longitudinal rigidity. In the case of comparable polyamide moulding compounds with round glass fibres, the transverse rigidity is at best 52% with respect to the longitudinal rigidity.

Furthermore, the moulding compounds according to the invention are distinguished by very good processability and flowability, The suitably selected matrix components (A1) and (A2), on the one hand, and also the special geometry of the glass fibres (B) contribute hereto equally.

The invention is explained subsequently in more detail with reference to the following examples.

The subsequently mentioned materials were used in the examples and comparative examples:
PA Type A: polyimide-66 with $n_{rel}$=1.82, RADICI, Italy
PA Type B: polyamide-6 with $n_{rel}$T 1.86, EMS-CHEMIE AG, Switzerland
PA Type C: polyamide 6I/6T (67 : 33) with $n_{rel}$=1.57, EMS-CHEMIE AG, Switzerland
PA Type D: polyamide 6I/6T (30 : 70) with $n_{rel}$=1.52, EMS-CHEMIE AG, Switzerland
PA Type E: polyamide MACM12 with $n_{rel}$=1.75, EMS-CHEMIE AG, Switzerland
PA Type F: polyamide MXD6/ MXDI (88:12) with $n_{rel}$=1.62, EMS-CHEMIE AG, Switzerland
Glass fibres type A: NITTOBO CSG3PA-820, 3 mm long, 28 pm wide, 7 μm thick, aspect ratio of the cross-sectional axes=4, aminosilane size, NITTO BOSEKI, Japan (flat glass fibres, according to the invention)
Glass fibres type B: CS 7928, 4.5 mm lomg, 10 μm diameter, BAYER AG, Germany (glass fibres with circular cross-section, state of the art)
Melapur® 200/70: a melamine polyphosphate (Ciba Spez. GmbH), flameproofing agent, CAS No.: 218768-84-4
Exolit® GP 1230: an organophosphoric salt (Clariant Produkte GmbH), flameproofing agent.

The moulding compounds of the compositions in Table 1 are produced on a twin-screw extruder by the company Werner and Pfleiderer Type ZSK 30. The granulates of the polyamide types A to E and also the flameproofing agents are metered into the feed zone, The glass fibre is metered into the polymer melt via a side feeder 3 in housing units in front of the nozzle.

The housing temperature was adjusted as an increasing profile to 290° C. At 150 to 200 rpm, 10 kg throughput was achieved. The granulation was effected by means of underwater granulation or hot cutting under water in which the polymer melt is pressed through a perforated nozzle and is granulated immediately after leaving the nozzle by a rotating blade in a water flow, After granulation and drying at 110° C. for 24 h, the granulate properties were measured and the test bodies produced.

The test bodies were produced on an Arburg injection moulding unit, the cylinder temperatures of 260° to 300° and a screw circumferential speed of 15 m/min being set. The mould temperature was chosen at 100-140° C.

The measurements were implemented according to the following standards and on the following test bodies.
Tensile modulus of elasticity:
ISO 527 with a tensile speed of 1 mm/min
ISO tensile bar, standard: ISO/CD 3167, $T_{ype}$ A1, 170 x 20/10 x 4 mm, temperature 23° C.
The transverse rigidity was determined on a BIAX test body (BIAX, published in Noss'Ovra staff magazine, Dec. 2006, No. 12, 29th year, EMS-CHEMIE AG) which allows direction-dependent measurement of the rigidity and strength.
Tearing strength and breaking elongation:
ISO 527 at a tensile speed of 5 mm/min
ISO tensile bar, standard: ISO/CD 3167, Type A1, 170 x 20/10 x 4 mm, temperature 23° C.

Flow spirals of the dimension 1.5 mm x 10 mm were prepared at a compound temperature of 290° and a mould temperature of 100° C.

Unless otherwise noted in the Table, the test bodies are used in the dry state. For this purpose, the test bodies are stored after the injection moulding for at least 48 h at room temperature in a dry environment.

TABLE 1

Composition and properties of examples 1-3 and comparative examples VB1-VB3

| Example | | 1 | VB1 | 2 | VB2 | 3 | VB3 |
|---|---|---|---|---|---|---|---|
| Composition | | | | | | | |
| PA Type A | % by wt. | 23.8 | 23.8 | 28.3 | 28.3 | 24.8 | 24.8 |
| PA Type B | % by wt. | | | 7.1 | 7.1 | | |
| PA Type C | % by wt. | 8.2 | 8.2 | | | | |
| PA Type D | % by wt. | | | | | 8.4 | 8.4 |
| Exolit ® OP 1230 | % by wt. | 14.0 | 14.0 | 14.2 | 14.2 | 14.0 | 14.0 |
| Melapur ® 200/70 | % by wt. | 2.0 | 2.0 | | | 2.0 | 2.0 |
| Alugel 34-TH (aluminium tristearate) | % by wt. | 0.5 | 0.5 | 0.2 | 0.2 | 0.5 | 0.5 |
| Stabilising/pigment | % by wt. | 1.5 | 1.5 | 0.2 | 0.2 | 0.3 | 0.3 |
| Glass fibres type A | % by wt. | 50.0 | | 50.0 | | 50.0 | |
| Glass fibres type B | % by wt. | | 50.0 | | 50.0 | | 50.0 |
| Properties | | | | | | | |
| MVR (275° C./21.6 kg) | $cm^3$/10 min | 360 | 140 | 320 | 110 | 350 | 180 |
| HDT C | ° C. | 198 | 165 | 201 | 167 | 196 | 165 |
| Tensile modulus of elasticity long. | MPa | 19500 | 18750 | 19700 | 18850 | 19550 | 18800 |
| Tensile modulus of elasticity trans. | MPa | 11300 | 9750 | 11400 | 9680 | 11570 | 9800 |
| Tearing strength long. | MPa | 192 | 175 | 198 | 177 | 193 | 175 |
| Tearing strength trans. | MPa | 100 | 86 | 103 | 88 | 98 | 85 |
| Breaking elongation | % | 1.5 | 1.4 | 1.4 | 1.3 | 1.5 | 1.4 |
| Notch impact strength Charpy, 23° C. | $kJ/m^2$ | 14 | 7 | 13 | 7 | 15 | 6 |
| Flow length (290°/100° C.) | mm | 320 | 210 | 300 | 190 | 330 | 180 |
| Fire classification UL-94 (thickness of the test bodies: 0.8 mm) | — | V0 | V0 | V0 | V0 | V0 | V0 |
| Processability | — | + | 0 | + | 0 | + | 0 |

"+": good,
"0": poor

The transverse strength was determined on a BIAX test body (BIAX, published in Noss'Ovra staff magazine, December 2006, No. 12, 29th year, EMS-CHEMIE AG) which allows direction-dependent measurement of the rigidity and strength.
Impact strength according to Charpy:
ISO 179/*eU
ISO test bar, standard; ISO/CD 3167, Type B1, 80 x 10 x 4 mm, temperature 23° C.
* 1 =not instrumented, 2 =instrumented
Notch impact strength according to Charpy:
ISO 179/*eA
ISO test bar, standard: ISO/CD 3167, Type /31, 80 x 10 x 4 mm, temperature 23° C.
* 1 =not instrumented, 2 =instrumented
Glass transition temperature (Tg), melt enthalpy (ΔH)
ISO standard 11357-1/-2 Granulate
The differential scanning calorimetry (USC) was implemented with a heating rate of 20° C/min.
Relative viscosity:
DIN EN ISO 307, in 0.5% by weight of m-cresol solution, temperature 20° C.
MVR: (Melt volume rate)
according to ISO 1133 at 275° C. and a load of 21.6 kg
Flow length:
The flow lengths were determined by means of an Arburg injection moulding machine (Type: ARBURG ALL-ROUNDER 320-210-750).

The test bodies produced from the moulding compounds of examples 1 to 3 have consistently higher rigidities and strengths than the corresponding comparative examples. This applies in particular even for the moduli and tearing strengths measured transversely to the main fibre direction.

Even with respect to thermostability, the moulding compounds according to the invention exhibit outstanding performance. The IDT C of the comparative examples is exceeded by examples 1 to 3 by more than 30° C.

The moulding compounds of the comparative examples VB1 - VB3 are critical in processing, i.e. injection moulding processing is difficult, hardly reproducible, requires high to very high filling pressures and the produced moulded articles have partial collapse-and/or defect sites and are difficult to remove from the mould. In contrast, the moulding compounds according to the invention can be processed very easily, even in the case of small wall thicknesses. Problems during removal from the mould did not occur in the case of examples 1 - 3. The required filling pressure in the case of the examples according to the invention was up to 40% lower than in the case of the comparative examples. Furthermore, the moulded articles produced from the moulding compounds according to the invention had noticeably smoother surfaces.

Hence the substantially better flow behaviour of the moulding compounds is in accordance with the flat glass fibres (non-circular cross-sectional area) which, in comparison with conventional glass fibre-reinforced moulding compounds (round glass fibres) have a flow length on average greater by 30-40%.

The invention claimed is:

1. A filled polyamide (PA) molding compound comprising
   A) 25-72% by weight of a polymer mixture forming a polyamide matrix containing
      A1) 55 to 90% by weight of an aliphatic polyamide selected from the group PA6, PA46, PA66, PA610, PA612, PA6/12, PA1010, PA11, PA12, PA1012, PA1212 and/or mixtures and/or copolyamide of these, the aliphatic polyamide having a solution viscosity $\eta_{rel}$, in the range of 1.3 to 1.90 measured according to DIN EN ISO 307 in 0.5% by weight of m-cresol at 20° C., and
      A2) 10 to 45% by weight of at least one polyamide selected from MACM10-18, MACMI, MACMT, PACM10-18, 6I/6T, the molar ratio of 6I to 6T units being in the range of 40:60 to 25:75, 6T/66, the molar ratio of 6T and 66 units being in the range of 50:50 to 70:30, and/or mixtures and/or copolyamides of these, the polyamide having a solution viscosity $\eta_{rel}$, in the range of 1.3 to 1.85 measured according to DIN EN ISO 307 in 0.5% by weight of m-cresol at 20° C.,
   B) 20 to 55% by weight of a glass fiber with a non-circular cross-sectional area and a dimensional ratio of the main cross-sectional axis to the subsidiary cross-sectional axis of 2 to 8, and also
   C) 8 -25% by weight of a flameproofing agent containing
      C1) 60 -100% by weight of at least one of a phosphinic acid salt and a diphosphinic acid salt,
      C2) 0-40% by weight of a melamine polyphosphate.

2. A PA molding compound according to claim 1 wherein the dimensional ratio of the main cross-sectional axis to the subsidiary cross-sectional axis is between 3.5 and 6.0.

3. A PA molding compound according to claim 1 the glass fiber is selected from the group consisting of E-glass fiber, A-glass fiber, C-glass fiber, D-glass fiber, M-glass fiber, S-glass fiber, R-glass fiber and mixtures of these.

4. A PA molding compound according to claim 1 wherein, in the case of the glass fiber, the length of the main cross-sectional axis is 6 to 40 μm and the length of the subsidiary cross-sectional axis is 3 to 20 μm.

5. A PA molding compound according to claim 1 wherein the glass fiber (B) is present in the form of cut glass with a fiber length of 0.2-20 mm.

6. A PA molding compound according to claim 1 wherein the glass fibers (B) is present in the form of endless glass fiber (rovings).

7. A PA molding compound according to claim 1 wherein the heat deflection temperature under load according to ASTM D 648 (HDT-C) is greater by at least 10° C. than the HDT-C of a comparable filled molding compound with respect to the PA matrix which is filled with glass fiber with a circular cross-section in comparable quantity ratios.

8. A PA molding compound according to claim 7 wherein the HDT-C is greater by 20° C.

9. A PA molding compound according to claim 1 comprising 55 to 85% by weight of component A1.

10. A PA molding compound according to claim 1 wherein component A2 is selected from the group consisting of MACM12, PACM12/MACM12, 6T/66, 6I/6T and/or mixtures and/or copolyamides of these.

11. A PA molding compound according to claim 1 further comprising up to 20% by weight of at least one of particle-shaped and layer-shaped fillers D.

12. A PA molding compound according to claim 11 comprising 0.1 to 15% by weight of particle-shaped and layer-shaped fillers D.

13. A PA molding compound according to claim 1 comprising up to 5% by weight of additives E.

14. A PA molding compound according to claim 13 comprising 0.1 to 5% by weight of additives E.

15. A PA molding compound according to claim 1 comprising:
    A: 25 to 72% by weight of the polyamide matrix,
    B: 20-55% by weight of glass fiber,
    C: 8-20% by weight of flameproofing agent,
    D: 0.1-15% by weight of filler and
    E: 0.1-5% by weight of additive,
    with the proviso that A+B+C+D+E is 100% by weight.

16. A method for the production of molded articles, the method comprising combining
    A) 25-72% by weight of a polymer mixture forming a polyamide matrix containing
       A1) 55 to 90% by weight of an aliphatic polyamide selected from the group PA6, PA46, PA66, PA610, PA612, PA6/12, PA1010, PA11, PA12, PA1012, PA1212 and/or mixtures and/or copolyamide of these, the aliphatic polyamide having a solution viscosity $\eta_{rel}$, in the range of 1.3 to 1.90 measured according to DIN EN ISO 307 in 0.5% by weight of m-cresol at 20° C., and
       A2) 10 to 45% by weight of at least one polyamide selected from MACM10-18, MACMI, MACMT, PACM10-18, 6I/6T, the molar ratio of 6I to 6T units being in the range of 40:60 to 25:75, 6T/66, the molar ratio of 6T and 66 units being in the range of 50:50 to 70:30, and/or mixtures and/or copolyamides of these, the polyamide having a solution viscosity $\eta_{rel}$, in the range of 1.3 to 1.85 measured according to DIN EN ISO 307 in 0.5% by weight of m-cresol at 20° C.,
    B) 20 to 55% by weight of a glass fiber with a non-circular cross-sectional area and a dimensional ratio of the main cross-sectional axis to the subsidiary cross-sectional axis of 2 to 8, and also
    C) 8 -25% by weight of a flameproofing agent containing
       C1) 60 -100% by weight of at least one of a phosphinic acid salt and a diphosphinic acid salt,
       C2) 0-40% by weight of a melamine polyphosphate.

17. A molded article made by combining
    A) 25-72% by weight of a polymer mixture forming a polyamide matrix containing
       A1) 55 to 90% by weight of an aliphatic polyamide selected from the group PA6, PA46, PA66, PA610, PA612, PA6/12, PA1010, PA11, PA12, PA1012, PA1212 and/or mixtures and/or copolyamide of these, the aliphatic polyamide having a solution viscosity $\eta_{rel}$, in the range of 1.3 to 1.90 measured according to DIN EN ISO 307 in 0.5% by weight of m-cresol at 20° C., and
       A2) 10 to 45% by weight of at least one polyamide selected from MACM10-18, MACMI, MACMT, PACM10-18, 6I/6T, the molar ratio of 6I to 6T units being in the range of 40:60 to 25:75, 6T/66, the molar ratio of 6T and 66 units being in the range of 50:50 to 70:30, and/or mixtures and/or copolyamides of these, the polyamide having a solution viscosity $\eta_{rel}$, in the range of 1.3 to 1.85 measured according to DIN EN ISO 307 in 0.5% by weight of m-cresol at 20° C.,
    B) 20 to 55% by weight of a glass fiber with a non-circular cross-sectional area and a dimensional ratio of the main cross-sectional axis to the subsidiary cross-sectional axis of 2 to 8, and also
    C) 8 -25% by weight of a flameproofing agent containing
       C1) 60 -100% by weight of at least one of a phosphinic acid salt and a diphosphinic acid salt,
       C2) 0-40% by weight of a melamine polyphosphate.

18. A molded article made by at least one of injection molding, extrusion, pultrusion, and blow molding a composition comprising
- A) 25-72% by weight of a polymer mixture forming a polyamide matrix containing
  - A1) 55 to 90% by weight of an aliphatic polyamide selected from the group PA6, PA46, PA66, PA610, PA612, PA6/12, PA 1010, PA11, PA12, PA1012, PA1212 and/or mixtures and/or copolyamide of these, the aliphatic polyamide having a solution viscosity $\eta_{rel}$, in the range of 1.3 to 1.90 measured according to DIN EN ISO 307 in 0.5% by weight of m-cresol at 20° C., and
  - A2) 10 to 45% by weight of at least one polyamide selected from MACM10-18, MACMI, MACMT, PACM10-18, 6I/6T, the molar ratio of 6I to 6T units being in the range of 40:60 to 25:75, 6T/66, the molar ratio of 6T and 66 units being in the range of 50:50 to 70:30, and/or mixtures and/or copolyamides of these, the polyamide having a solution viscosity $\eta_{rel}$, in the range of 1.3 to 1.85 measured according to DIN EN ISO 307 in 0.5% by weight of m-cresol at 20° C.,
- B) 20 to 55% by weight of a glass fiber with a non-circular cross-sectional area and a dimensional ratio of the main cross-sectional axis to the subsidiary cross-sectional axis of 2 to 8, and also
- C) 8 -25% by weight of a flameproofing agent containing
- C1) 60 -100% by weight of at least one of a phosphinic acid salt and a diphosphinic acid salt,
- C2) 0-40% by weight of a melamine polyphosphate.

* * * * *